(12) United States Patent
Raghu et al.

(10) Patent No.: US 10,019,285 B2
(45) Date of Patent: Jul. 10, 2018

(54) NATURAL LANGUAGE CONVERSATION-BASED PROGRAMMING

(71) Applicant: International Business Machines Corporation, Armonk, NY (US)

(72) Inventors: Dinesh Raghu, New Delhi (IN); Nishant Sinha, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 329 days.

(21) Appl. No.: 15/042,266

(22) Filed: Feb. 12, 2016

(65) Prior Publication Data
US 2017/0235599 A1 Aug. 17, 2017

(51) Int. Cl.
*G06F 9/45* (2006.01)
*G06F 9/48* (2006.01)
*G06F 17/28* (2006.01)
*G06F 9/54* (2006.01)

(52) U.S. Cl.
CPC ............ *G06F 9/4881* (2013.01); *G06F 9/543* (2013.01); *G06F 17/28* (2013.01)

(58) Field of Classification Search
None
See application file for complete search history.

(56) References Cited

U.S. PATENT DOCUMENTS

| 9,092,276 B2 | 7/2015 | Allen et al. | |
|---|---|---|---|
| 2014/0380286 A1* | 12/2014 | Gabel | G06F 8/20 717/139 |

OTHER PUBLICATIONS

Bergamaschi et al., "QUEST: A Keyword Search System for Relational Data based on Semantic and Machine Learning Techniques", Proceedings of the VLDB Endowment, vol. 6, No. 12, pp. 1222-1225, Copyright 2013 VLDB Endowment 21508097/13/10.
Gulwani et al., "NLyze: Interactive Programming by Natural Language for SpreadSheet Data Analysis and Manipulation", SIGMOD'14, Jun. 22-27, 2014, Snowbird, UT, USA, pp. 803-814, Copyright is held by the owner/author(s), Publication rights licensed to ACM, ACM 978-1-4503-2376-5/14/06, <http://dx.doi.org/10.1145/2588555.2612177>.

(Continued)

*Primary Examiner* — Qamrun Nahar
(74) *Attorney, Agent, or Firm* — Gilbert Harmon, Jr.

(57) ABSTRACT

A computer-implemented method includes receiving, from a natural language interface system, a natural language task specification, and converting the natural language task specification into a domain independent data flow graph. The data flow graph includes substeps. The method further includes: presenting the data flow graph via the natural language interface system as a natural language program; interactively refining the natural language program; and correspondingly modifying the data flow graph. The computer-implemented method further includes, for each substep: selecting one or more candidate APIs from an API library, based on the substep; interactively narrowing the one or more candidate APIs to at least one selected API; implementing the substep by specifying one or more calls to the at least one selected API to yield a substep implementation; and appending the substep implementation to a result program. A corresponding computer program product and computer system are also disclosed.

20 Claims, 5 Drawing Sheets

(56) References Cited

OTHER PUBLICATIONS

Gvero et al., "Complete Completion using Types and Weights", PLDI'13, Jun. 16-19, 2013, Seattle, WA, USA, pp. 27-38, Copyright © 2013 ACM 978-1-4503-2014-6/13/06.
Le et al, "Keyword Programming for TouchDevelop", Abstract only, MobiSys'13, Jun. 25-28, 2013, Taiwan, ACM 978-1-4503-1672-9/13/06, 1 page, Copyright is held by the author/owner(s).
Mandelin et al., "Jungloid Mining: Helping to Navigate the API Jungle", PLDI'05, Jun. 12-15, 2005, Chicago, Illinois, USA, pp. 48-61, Copyright 2005 ACM 1-59593-056-6/05/0006.
Perelman et al., "Type-Directed Completion of Partial Expressions", PLDI'12, Jun. 11-16, 2012, Beijing, China, pp. 275-285, Copyright © 2012 ACM 978-1-4503-1205-9/12/06.
Popescu et al., "Towards a Theory of Natural Language Interfaces to Databases", IUI '03, Jan. 12-15, 2003, Miami, Florida, USA, Copyright 2003 ACM, ACM 1-58113-586-6/03/0001, pp. 149-157.

\* cited by examiner

NATURAL LANGUAGE CONVERSATION-BASED PROGRAMMING

BACKGROUND

The present invention relates generally to the field of interactive software programming, and more particularly to natural language conversation based programming.

The modern Internet, as well as many programming environments, offer a rich selection of useful Application Programming Interfaces ("APIs"), for both online and offline delivery, for a wide variety of software tasks. However, it is difficult for any individual developer to maintain a working knowledge of and stay updated on all of the different APIs that may be available. Despite various automation tools, developers continue to face challenges, such as steep learning curves and production delay, due to unfamiliarity with many available APIs.

SUMMARY

A computer-implemented method includes receiving, from a natural language interface system, a natural language task specification, and converting the natural language task specification into a domain independent data flow graph. The domain independent data flow graph includes one or more substeps. The computer-implemented method further includes: presenting the domain independent data flow graph via the natural language interface system as a natural language program; interactively refining, by the natural language interface system, the natural language program; and correspondingly modifying the domain independent data flow graph. The computer-implemented method further includes, for each substep of the one or more substeps: selecting one or more candidate APIs from an API library, based on the substep; interactively narrowing, by the natural language interface system, the one or more candidate APIs to at least one selected application programming interface; implementing the substep by specifying one or more calls to the at least one selected API to yield a substep implementation; and appending the substep implementation to a result program. A corresponding computer program product and computer system are also disclosed.

DETAILED DESCRIPTION

Figure 1:
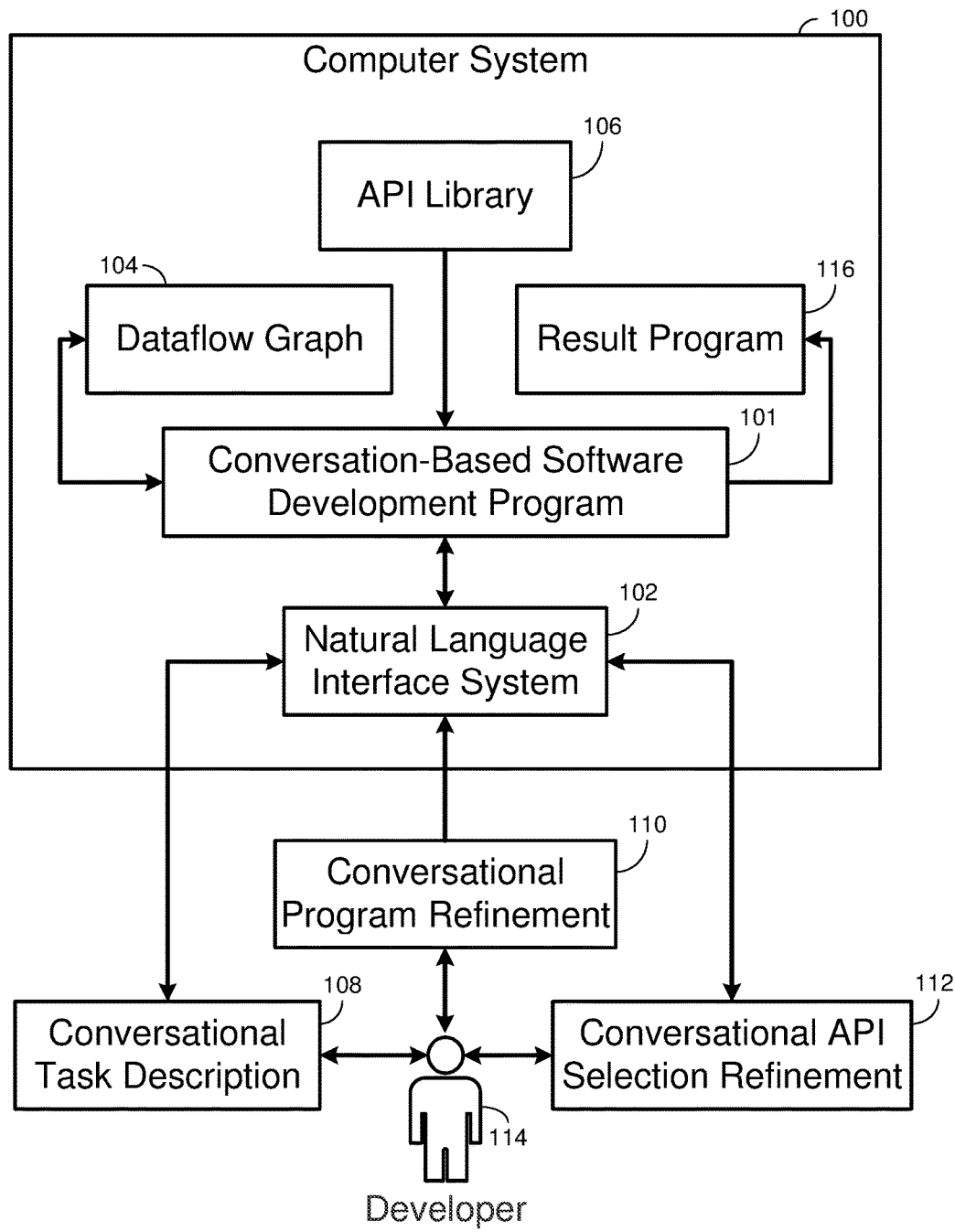
FIG. 1 is a block diagram depicting an operational environment suitable for performing a conversation-based software development program, in accordance with at least one embodiment of the present invention.

FIG. 1 is a block diagram depicting an operational environment suitable performing a conversation-based software development program 101, in accordance with at least one embodiment of the present invention. A computer system 100 may be one or more general purpose computers such as the computer 500 depicted in FIG. 5 operating alone or in the context of a network. Operating within the computer system 100 is the conversation-based software development program 101. Also operating within the computer system 100 is a natural language interface system 102. The natural language interface system 102 may be a system that combines voice recognition, speech generation, and cognitive functionality to enable spoken conversation between a human and the computer system 100. Alternatively, the natural language interface system 102 may be text-based, for example, the natural language conversation may be exposed to a human as a chat function. More generally, any interface between natural human language and the computer system 100 is sufficient for the natural language interface system 102. The conversation-based software development program 101 communicates with a developer 114 via the natural language interface system 102.

The conversation-based software development program 101 creates, accesses, and modifies a domain independent data flow graph 104 as an intermediate product of the method of the present invention. The conversation-based software development program 101 accesses an API library 106. The API library 106 includes detailed descriptions of the functions, inputs, and outputs of various APIs that are available to the developer 114, but with which the developer 114 may lack a detailed and up-to-date knowledge. The conversation-based software development program 101 may generate a result program 116, which is the program created by the developer 114 through the various methods disclosed herein.

Throughout the methods disclosed herein, the natural language interface system 102 may interact with the developer 114 in various ways. For example, software development may begin by the developer 114 stating a conversational task description 108—the problem that the developer 114 wishes to solve. The natural language interface system 102 may convert the heard, entered, or otherwise detected conversational task description 108 into an electronically stored and programmatically accessible form, such as electronic text containing the optionally formalized and sanitized natural language task specification. In another mode of interaction, the natural language interface system 102 may engage in conversational program refinement 110 of proposed steps with the developer 114 whereby the developer 114 may clarify, by natural language, ambiguities in the desired functionality. In another mode of interaction, the developer engage in conversational API selection refinement 112, whereby the developer 114 may specify additional feature requirements for or preferences among various APIs that are suited to the task facing the developer 114.

Figure 2:
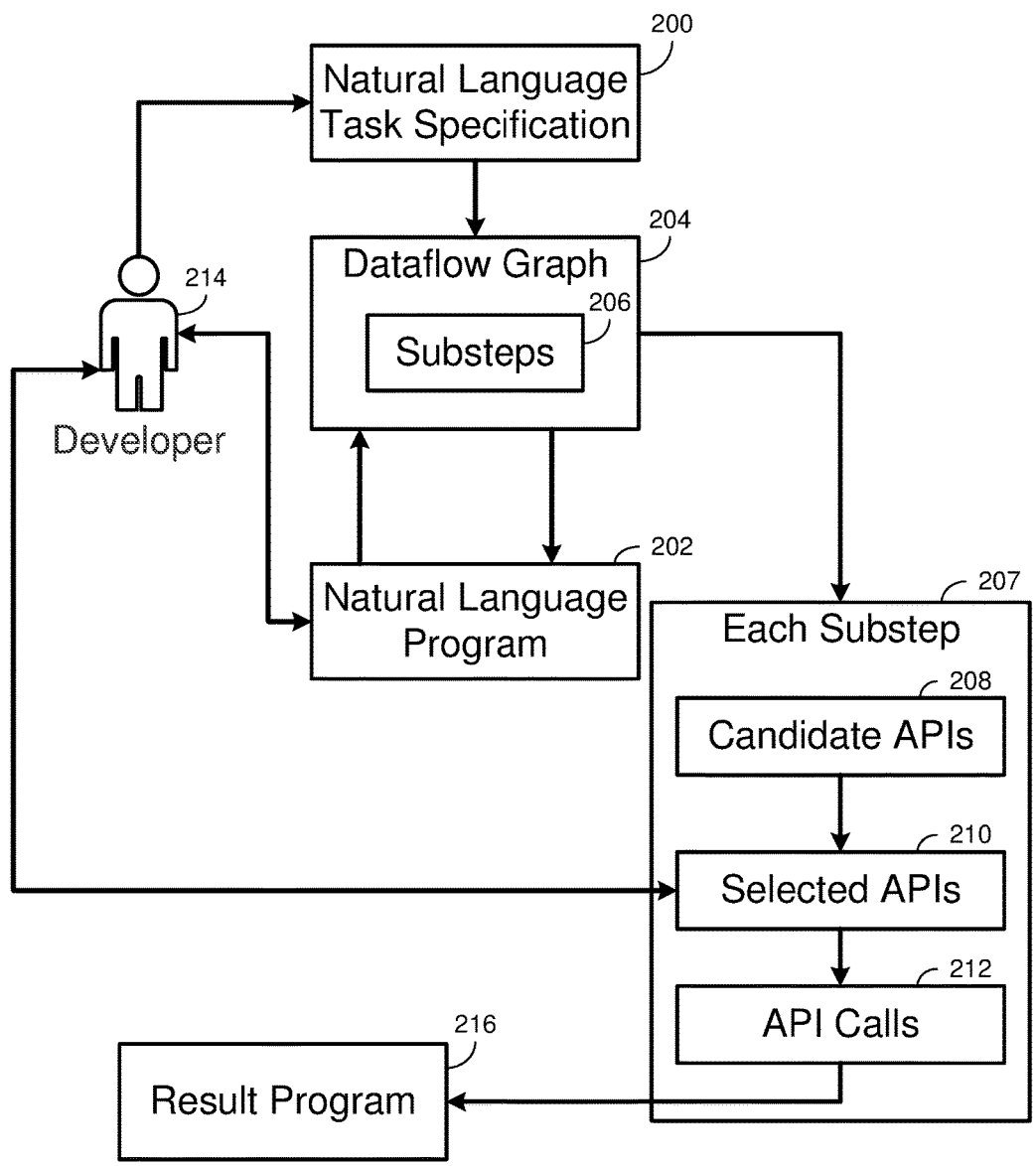
FIG. 2 is a data flow diagram for a conversation-based software development program, in accordance with at least one embodiment of the present invention.

FIG. 2 is a data flow diagram for the conversation-based software development program 101, in accordance with at least one embodiment of the present invention. In the depicted embodiment, the developer 214 articulates a natural language task specification 200. For example, the developer 114 may articulate "book me a flight from Bangalore to Delhi on the 10th". In the stated example, fixed values are given as input parameters, though other implementations could involve the specification of variable parameters as well. The conversation-based software development program 101 may transform the natural language task specification into a domain independent data flow graph 204. In the context of the present invention, for a data flow graph to be domain independent means that the graph can express a program specified by the developer only in terms of its inputs and outputs, and not in terms of its specific operating environment, hardware, API calls, etc. The domain independent data flow graph may include a number of substeps 206, which may be represented as nodes connected by edges. The edges may specify inputs to outputs of the various substeps 206 such that the domain independent data flow graph 204 specifies a mapping of inputs to outputs for the eventual result program 216.

The conversation-based software development program 101 may generate, based on the domain independent data flow graph 204, a natural language program 202. The natural language program may express the substeps 206 in human understandable phrases. For example, in the above example "Book me a flight from Bangalore to Delhi on the 10th", the natural language program might read as follows:

F1=Get Flights
F2=Filter F1 by "from Bangalore to Delhi"
F3=Filter F2 by "10th"
F4=Choose flight from F3
T=Book F4
Code Listing 1

The conversation-based software development program 101 may present the natural language program 202 to the developer 114 via the natural language interface system 102, and the developer 114 may conversationally refine and modify the natural language program 202 by any of a number of edit commands that might modify lines of natural language "code". More formally, refining the natural language program 202 may include at least one refinement step selected from the group consisting of: (a) inserting one or more lines into the natural language program 202; (b) deleting one or more lines from the natural language program 202; (c) replacing one or more phrases of the natural language program 202; merging two or more lines of the natural language program 202; splitting one or more lines of the natural language program 202; (f) changing at least one input to the natural language program 202; and (g) changing at least one output of the natural language program 202. Each refinement step may be mapped to a natural language edit command; a natural language edit command may be understood as a natural language phrase that invokes a refinement step. In the Bangalore-Delhi flight example, the conversation-based software development program 101 might identify ambiguity in the filter "10th", and prompt the developer 114 to clarify. The developer might reply with a natural language edit command "replace '10th' with "10 May 2015".

The conversation-based software development program 101 may generate a result program 216 by processing the substeps 206. At each substep 207, the conversation-based software development program 101 may generate a list of candidate APIs 208 from the API library 106. Where more than one API will work, the conversation-based software development program 101 may conversationally refine the candidate APIs by asking the developer 114 to further specify needs and preferences. In the Bangalore-Delhi example, the conversation-based software development program may identify, for the steps F1-F4, APIs that provide flight search and filtering functionality, and it may come up with four candidates: WeGo Flights API, QPX Express API, Clear Trip API, and Travel Fusion API. Each of these APIs has different features and functionality, and the conversation-based software development program 101 may reach a choice of a selected API 210 or a combination of selected APIs 210 that is/are sufficient to complete the particular sub step 207 by asking the developer questions that are directed to choosing among the features of the various candidate APIs 208. The conversation-based software development program 101 may repeat the API narrowing process separately for step T, booking the flight, and use a different API or combination of APIs.

Based on determining the selected API 210 or combination of APIs 210 for the particular substep 207, the conversation-based software development program 101 may generate the correct API calls 212 that complete the particular substep 207, and append the API calls 212 to the result program 116. The result program 116 may then be run by the developer 114, packaged for distribution, or otherwise used. A possible advantage that may be present in various embodiment of the present invention (though not required for the practice of the invention) is that the result program 116 can mix and match APIs between and within substeps 206 because each substep 206 may have its own API evaluation. This may enable the conversation-based software development program 101 to overcome a major limitation with API use, which is the developer's familiarity with various APIs and alternatives.

Figure 3:
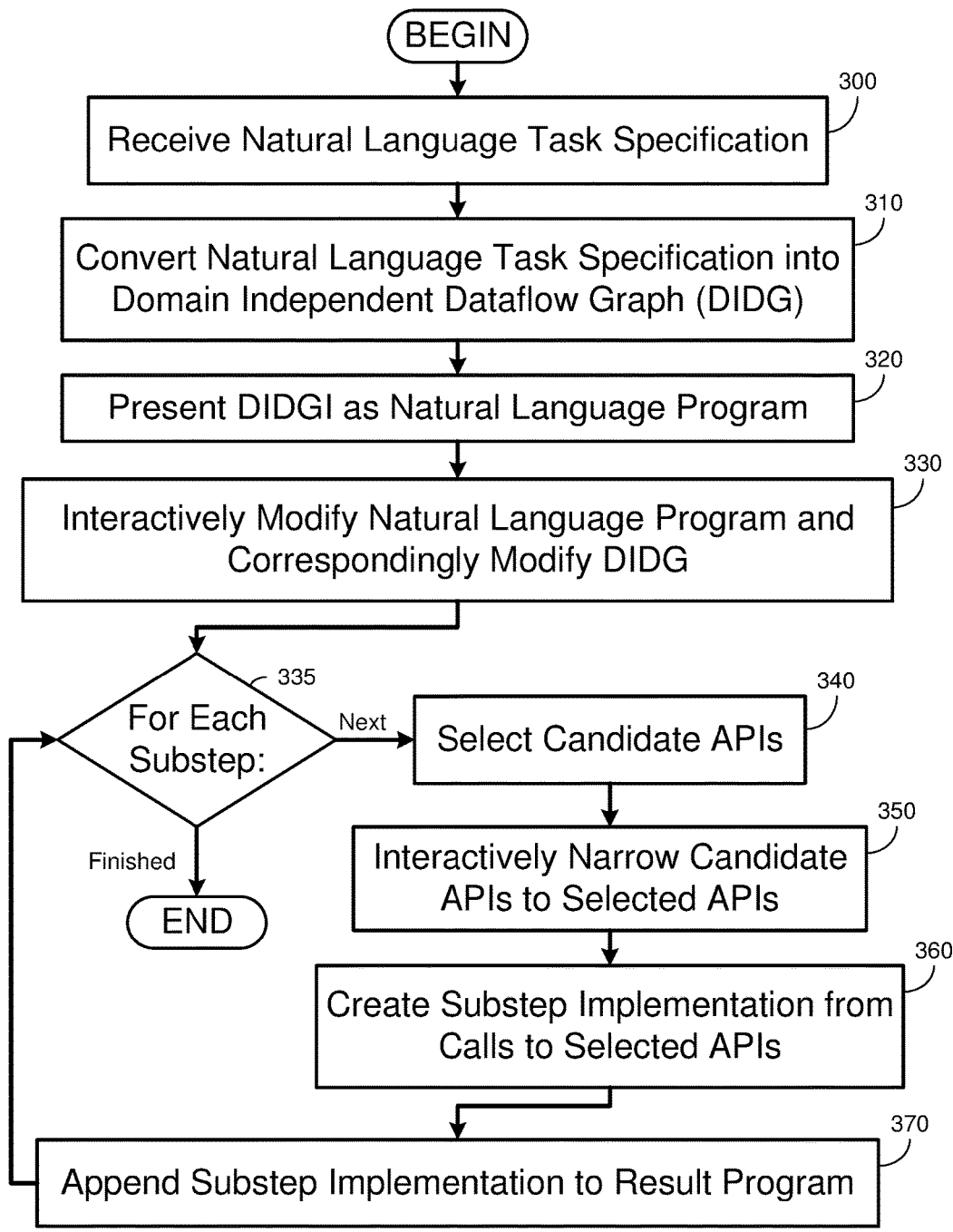
FIG. 3 is a flowchart diagram depicting various steps for a conversation-based software development program, in accordance with at least one embodiment of the present invention.

Referring now to FIG. 3, FIG. 3 is a flowchart diagram depicting various steps for the conversation-based software development program 101, in accordance with at least one embodiment of the present invention. At step 300, the conversation-based software development program 101 receives, from a natural language interface system 102, a natural language task specification 200. At step 310, conversation-based software development program 101 converts the natural language task specification 200 into a domain independent data flow graph 204. The domain independent data flow graph includes one or more substeps 206. At step 320, the conversation-based software development program 101 presents the domain independent data flow graph 204 via the natural language interface system 102 as a natural language program 202. At step 330, the conversation-based software development program 101 interactively refines, by the natural language interface system 102, the natural language program 202 and correspondingly modifies the domain independent data flow graph 204.

Referring still to the flowchart diagram of FIG. 3, at decision block 335, the conversation-based software development program 101 iterates over each substep 206. For each substep of the one or more substeps 206 (decision block 335 "next" branch), at step 340, the conversation-based software development program 101 selects one or more candidate application programming interfaces (candidate APIs 208) from an application programming interface library (API library 106), based on the substep. At step 350, the conversation-based software development program 101 interactively narrows, by the natural language interface system 102, the one or more candidate application programming interfaces (candidate APIs 208) to at least one selected application programming interface (selected APIs 210) for the substep. At step 360, the conversation-based software development program 101 implements the substep by specifying one or more calls to the at least one selected application programming interface (selected APIs 210) to yield a substep implementation (API calls 212). At step 370, the conversation-based software development program 101 appends the substep implementation (API calls 212) to a result program 216.

For performing step 350, narrowing the candidate APIs 208, the conversation-based software development program 101 may employ a subspace clustering technique. For a given number of dimensions d in a parameter space, there can be $2^d$ subspaces. Each dimension can be understood as a categorical, with different candidate APIs 208 being positioned within different subspaces. APIs that fall within the same subspace for a given dimension form a cluster for purposes of the parameter associated with the given dimension. For any dimension, it is possible to compute a score designating how useful asking questions about a cluster is likely to be, based on the entropy and a prior.

Score (H(S)) without a prior may be computed as follows:

$$p_i = \frac{\text{Number of APIs in cluster}_i}{\text{Total number of APIs}} \qquad \text{Equation 1}$$

$$H(S) = -\sum_{i \in \#Clusters} p_i \cdot \log(p_i) \qquad \text{Equation 2}$$

Score (H(S)) with a prior may be computed as follows:

$$p_i = \frac{\text{Number of APIs in cluster}_i \cdot \text{Prior}_i}{\sum_{j \in \#Clusters} \text{Number of APIs in cluster}_j \cdot \text{Prior}_j} \qquad \text{Equation 3}$$

$$H(S) = -\sum_{i \in \#Clusters} p_i \cdot \log(p_i) \qquad \text{Equation 4}$$

Where entropy is above zero or a nonzero threshold, the conversation-based software development program 101 may use the computed score to identify which parameters to ask about. Specifically, the questions may be targeted to exclude the largest clusters, thereby reducing entropy by the most APIs per question. Each question may be presented in multiple choice form with an optional limit on the number of choices, e.g., 3.

Where entropy is zero or below a threshold, the conversation-based software development program 101 may simply collect a value for the parameter. In alternative embodiments, the developer 114 may create general purpose programs specify a field or object as a parameter rather than a fixed value. In the case of a special purpose or specific value program such as the Bangalore-Delhi flight example, the present invention may enable users with limited or no traditional programming skills to take advantage of the wealth of APIs available today, especially publically usable HTTP-based Internet APIs, without the complexity of coding being exposed to the end user. For more sophisticated users, manipulating fields or objects can allow more extensible programs to be created using the present invention without the user having to be familiar with the details of many APIs.

Figure 4:
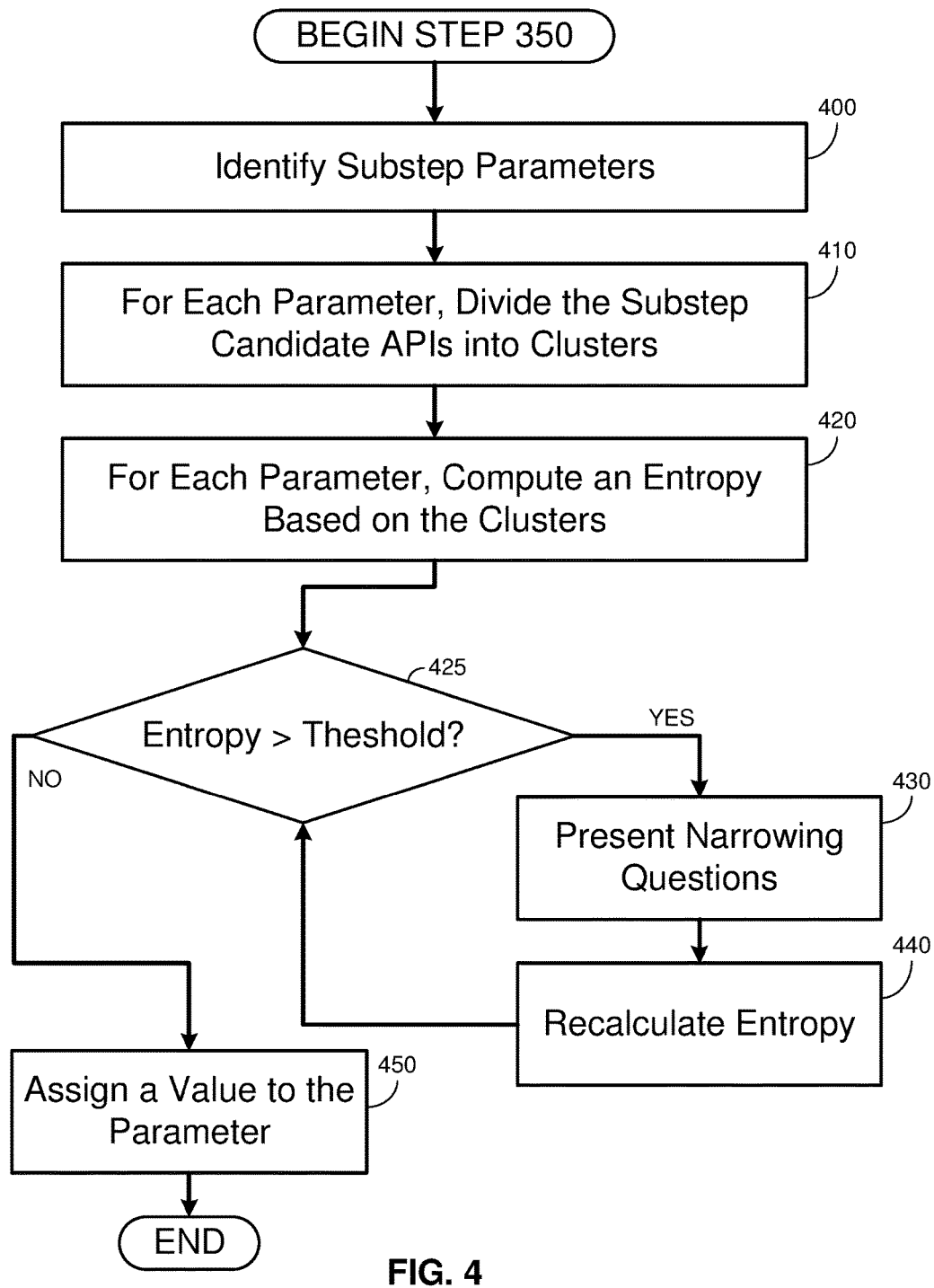
FIG. 4 is a flowchart diagram depicting various operational steps for interactively narrowing candidate APIs in the context of a conversation-based software development program, in accordance with at least one embodiment of the present invention.

Referring now to FIG. 4, FIG. 4 is a flowchart diagram displaying various operational steps for narrowing the candidate APIs 208 as per step 350. At step 400, the conversation-based software development program 101 identifies, for the substep, one or more parameters. For each of the one or more parameters, at step 410, the conversation-based software development program 101 divides the one or more candidate application programming interfaces (candidate APIs 208) into one or more clusters. At step 420, for each parameter, the conversation-based software development program 101 computes an entropy based on the one or more clusters. At decision block 425, responsive to the entropy being greater than an entropy threshold: at step 430, the conversation-based software development program 101 presents, by the natural language interface system 102, one or more narrowing questions and, at step 440, recalculating the entropy, based on the one or more narrowing questions, until the entropy is below the entropy threshold. Responsive to the entropy being equal to or less than the entropy threshold, at step 450, assigning a value to the parameter.

In some embodiments where the cluster technique of FIG. 4 is used, the entropy threshold may be zero—i.e., the conversation-based software development program 101 may be configured to require complete distinction of all APIs from one another. In alternative embodiments, entropy may be reduced below a nonzero threshold below which the APIs may be understood as functionally the same, and in such case the conversation-based software development program 101 may choose based on a rule, or randomly. One possible advantage of embodiments that employ the cluster analysis of FIG. 4 (not a required feature for any embodiment) is that the number of questions needed to narrow the candidate APIs 208 to an entropy of zero is no greater than the log of the number of candidate APIs 208; this is so because each question is configured to exclude the maximum amount of entropy and the most alternatives, based on the answer.

Figure 5:
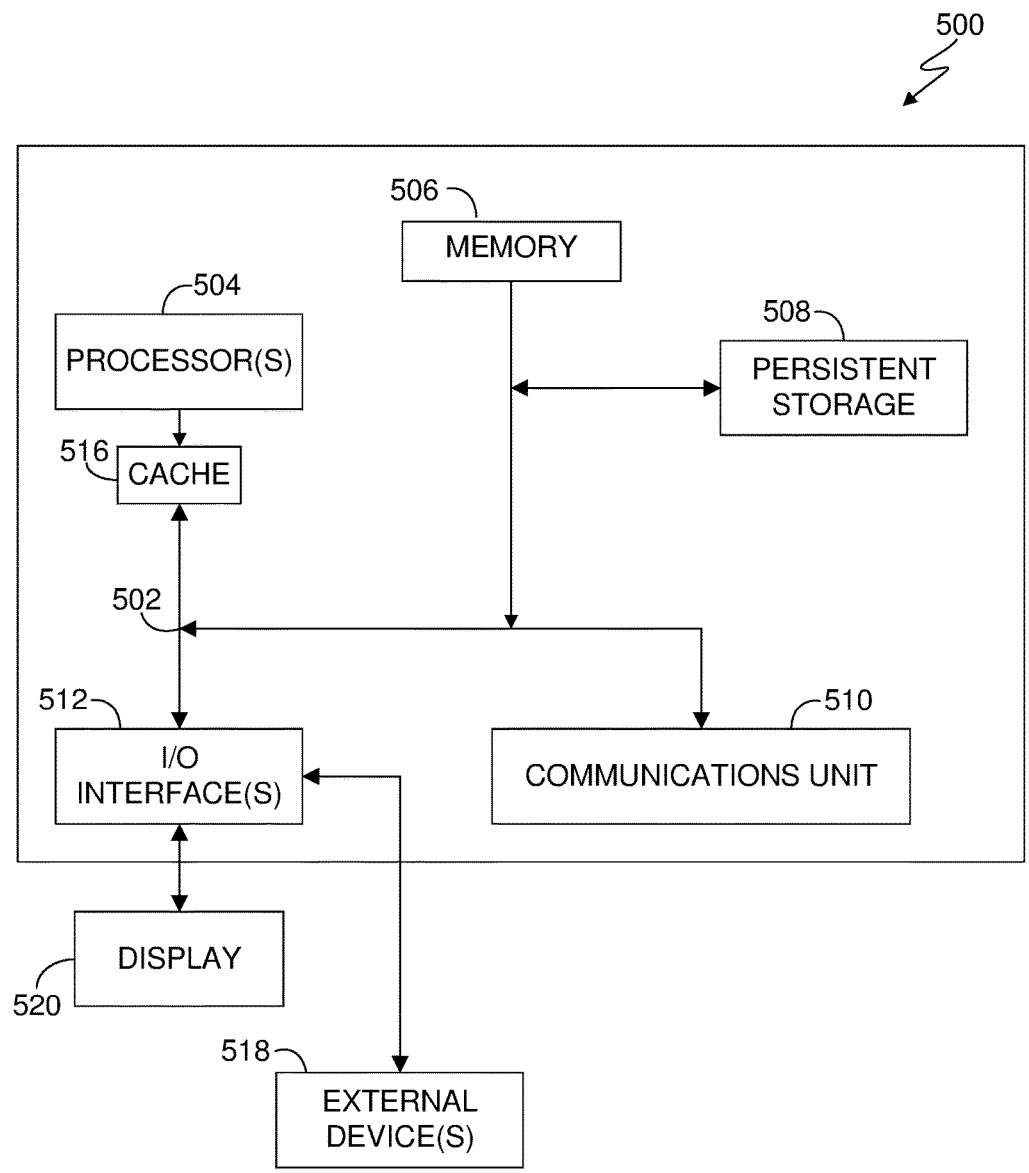
FIG. 5 is a block diagram depicting various logical elements for a computer system capable of executing program instructions, in accordance with at least one embodiment of the present invention.

FIG. 5 is a block diagram depicting components of a computer 500 suitable for executing the conversation-based software development program 101. FIG. 5 displays the computer 500, the one or more processor(s) 504 (including one or more computer processors), the communications fabric 502, the memory 506, the RAM, the cache 516, the persistent storage 508, the communications unit 510, the I/O interfaces 512, the display 520, and the external devices 518. It should be appreciated that FIG. 5 provides only an illustration of one embodiment and does not imply any limitations with regard to the environments in which different embodiments may be implemented. Many modifications to the depicted environment may be made.

As depicted, the computer 500 operates over a communications fabric 502, which provides communications between the cache 516, the computer processor(s) 504, the memory 506, the persistent storage 508, the communications unit 510, and the input/output (I/O) interface(s) 512. The communications fabric 502 may be implemented with any architecture suitable for passing data and/or control information between the processors 504 (e.g., microprocessors, communications processors, and network processors, etc.), the memory 506, the external devices 518, and any other hardware components within a system. For example, the communications fabric 502 may be implemented with one or more buses or a crossbar switch.

The memory 506 and persistent storage 508 are computer readable storage media. In the depicted embodiment, the memory 506 includes a random access memory (RAM). In general, the memory 506 may include any suitable volatile or non-volatile implementations of one or more computer readable storage media. The cache 516 is a fast memory that enhances the performance of computer processor(s) 504 by holding recently accessed data, and data near accessed data, from memory 506.

Program instructions for the conversation-based software development program 101 may be stored in the persistent storage 508 or in memory 506, or more generally, any computer readable storage media, for execution by one or more of the respective computer processors 504 via the cache 516. The persistent storage 508 may include a magnetic hard disk drive. Alternatively, or in addition to a magnetic hard disk drive, the persistent storage 508 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of the persistent storage 508.

The communications unit 510, in these examples, provides for communications with other data processing systems or devices. In these examples, the communications unit 510 may include one or more network interface cards. The communications unit 510 may provide communications through the use of either or both physical and wireless communications links. The conversation-based software development program may be downloaded to the persistent storage 508 through the communications unit 510. In the context of some embodiments of the present invention, the source of the various input data may be physically remote to the computer 500 such that the input data may be received and the output similarly transmitted via the communications unit 510.

The I/O interface(s) 512 allows for input and output of data with other devices that may operate in conjunction with the computer 500. For example, the I/O interface 512 may provide a connection to the external devices 518, which may include a keyboard, keypad, a touch screen, and/or some other suitable input devices. External devices 518 may also include portable computer readable storage media, for example, thumb drives, portable optical or magnetic disks, and memory cards. Software and data used to practice embodiments of the present invention may be stored on such portable computer readable storage media and may be loaded onto the persistent storage 508 via the I/O interface(s) 512. The I/O interface(s) 512 may similarly connect to a display 520. The display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   receiving, from a natural language interface system, a natural language task specification;
   converting said natural language task specification into a domain independent data flow graph, said domain independent data flow graph comprising one or more substeps;
   presenting said domain independent data flow graph via said natural language interface system as a natural language program;
   interactively refining, by said natural language interface system, said natural language program and correspondingly modifying said domain independent data flow graph;
   for each substep of said one or more substeps:
      selecting one or more candidate application programming interfaces from an application programming interface library, based on said substep;
      interactively narrowing, by said natural language interface system, said one or more candidate application programming interfaces to at least one selected application programming interface;
      implementing said substep by specifying one or more calls to said at least one selected application programming interface to yield a substep implementation; and
      appending said substep implementation to a result program.

2. The computer-implemented method of claim 1, wherein refining said natural language program comprises at least one refinement step selected from the group consisting of:
   (a) inserting one or more lines into said natural language program;
   (b) deleting one or more lines from said natural language program;
   (c) replacing one or more phrases of said natural language program;
   (d) merging two or more lines of said natural language program;
   (e) splitting one or more lines of said natural language program;
   (f) changing at least one input to said natural language program; and
   (g) changing at least one output of said natural language program.

3. The computer-implemented method of claim 2, wherein each said at least one refinement step is mapped to a natural language edit command.

4. The computer-implemented method of claim 1, wherein said domain independent data flow graph specifies a mapping of inputs to outputs.

5. The computer-implemented method of claim 1, wherein interactively narrowing said one or more candidate application programming interfaces comprises:
   identifying, for said substep, one or more parameters;
   for each parameter of said one or more parameters:
      dividing said one or more candidate application programming interfaces into one or more clusters;
      computing an entropy, based on said one or more clusters;
      responsive to said entropy being greater than an entropy threshold:
         presenting, by said natural language interface system, one or more narrowing questions and recalculating said entropy, based on said one or more narrowing questions, until said entropy is at or below said entropy threshold; and
      responsive to said entropy being equal to or less than said entropy threshold:
         assigning a value to said parameter.

6. The computer-implemented method of claim 5, wherein said one or more narrowing questions are, in number, no greater than the log of the number of said one or more candidate application programming interfaces.

7. The computer-implemented method of claim 5, wherein said entropy threshold is zero.

8. A computer program product comprising one or more computer readable storage media and program instructions stored on said one or more computer readable storage media, said program instructions comprising instructions to:
   receive, from a natural language interface system, a natural language task specification;
   convert said natural language task specification into a domain independent data flow graph, said domain independent data flow graph comprising one or more substeps;

present said domain independent data flow graph via said natural language interface system as a natural language program;

interactively refine, by said natural language interface system, said natural language program and correspondingly modify said domain independent data flow graph;

for each substep of said one or more substeps:
   select one or more candidate application programming interfaces from an application programming interface library, based on said substep;
   interactively narrow, by said natural language interface system, said one or more candidate application programming interfaces to at least one selected application programming interface;
   implement said substep by specifying one or more calls to said at least one selected application programming interface to yield a substep implementation; and
   append said substep implementation to a result program.

9. The computer program product of claim 8, wherein said instructions to refine said natural language program comprise instructions to perform at least one refinement step selected from the group consisting of:
   (a) inserting one or more lines into said natural language program;
   (b) deleting one or more lines from said natural language program;
   (c) replacing one or more phrases of said natural language program;
   (d) merging two or more lines of said natural language program;
   (e) splitting one or more lines of said natural language program;
   (f) changing at least one input to said natural language program; and
   (g) changing at least one output of said natural language program.

10. The computer program product of claim 9, wherein each said at least one refinement step is mapped to a natural language edit command.

11. The computer program product of claim 8, wherein said domain independent data flow graph specifies a mapping of inputs to outputs.

12. The computer program product of claim 8, wherein said instructions to interactively narrow said one or more candidate application programming interfaces comprises instructions to:
   identify, for said substep, one or more parameters;
   for each parameter of said one or more parameters:
      divide said one or more candidate application programming interfaces into one or more clusters;
      compute an entropy, based on said one or more clusters;
      responsive to said entropy being greater than an entropy threshold:
         present, by said natural language interface system, one or more narrowing questions and recalculate said entropy, based on said one or more narrowing questions, until said entropy is at or below said entropy threshold; and
      responsive to said entropy being equal to or less than said entropy threshold:
         assigning a value to said parameter.

13. The computer program product of claim 12, wherein said one or more narrowing questions are, in number, no greater than the log of the number of said one or more candidate application programming interfaces.

14. The computer program product of claim 12, wherein said entropy threshold is zero.

15. A computer system comprising:
   one or more processors;
   one or more computer readable storage media;
   computer program instructions;
   said computer program instructions being stored on said one or more computer readable storage media;
   said computer program instructions comprising instructions to:
      receive, from a natural language interface system, a natural language task specification;
      convert said natural language task specification into a domain independent data flow graph, said domain independent data flow graph comprising one or more substeps;
      present said domain independent data flow graph via said natural language interface system as a natural language program;
      interactively refine, by said natural language interface system, said natural language program and correspondingly modify said domain independent data flow graph;
      for each substep of said one or more substeps:
         select one or more candidate application programming interfaces from an application programming interface library, based on said substep;
         interactively narrow, by said natural language interface system, said one or more candidate application programming interfaces to at least one selected application programming interface;
         implement said substep by specifying one or more calls to said at least one selected application programming interface to yield a substep implementation; and
         append said substep implementation to a result program.

16. The computer system of claim 15, wherein said instructions to refine said natural language program comprise instructions to perform at least one refinement step selected from the group consisting of:
   (a) inserting one or more lines into said natural language program;
   (b) deleting one or more lines from said natural language program;
   (c) replacing one or more phrases of said natural language program;
   (d) merging two or more lines of said natural language program;
   (e) splitting one or more lines of said natural language program;
   (f) changing at least one input to said natural language program; and
   (g) changing at least one output of said natural language program.

17. The computer system of claim 16, wherein each said at least one refinement step is mapped to a natural language edit command.

18. The computer system of claim 15, wherein said domain independent data flow graph specifies a mapping of inputs to outputs.

19. The computer system of claim 15, wherein said instructions to interactively narrow said one or more candidate application programming interfaces comprises instructions to:
   identify, for said substep, one or more parameters;
   for each parameter of said one or more parameters:

divide said one or more candidate application programming interfaces into one or more clusters;
compute an entropy, based on said one or more clusters;
responsive to said entropy being greater than an entropy threshold:
present, by said natural language interface system, one or more narrowing questions and recalculate said entropy, based on said one or more narrowing questions, until said entropy is at or below said entropy threshold; and
responsive to said entropy being equal to or less than said entropy threshold:
assigning a value to said parameter.

20. The computer system of claim 15, wherein said one or more narrowing questions are, in number, no greater than the log of the number of said one or more candidate application programming interfaces.

\* \* \* \* \*